(No Model.)

H. DELHAYE.
GRAIN CONVEYER.

No. 351,854. Patented Nov. 2, 1886.

Witnesses:
Harry M. Turk
Gustav Schnoppé

Inventor:
Henry Delhaye
by Briesen & Steele
Attorneys.

UNITED STATES PATENT OFFICE.

HENRY DELHAYE, OF PARIS, FRANCE.

GRAIN-CONVEYER.

SPECIFICATION forming part of Letters Patent No. 351,854, dated November 2, 1886.

Application filed May 21, 1886. Serial No. 202,855. (No model.)

*To all whom it may concern:*

Be it known that I, HENRY DELHAYE, of the city of Paris, France, have invented a new and useful apparatus for elevating and transporting pulverulent or granular matters to any height or distance by means of compressed-air jets, of which the following is a full, clear, and exact description.

This invention relates to an apparatus for elevating and transporting pulverulent or granular matters to any height or distance by means of compressed-air jets, and which from its simplicity is adapted more particularly for loading or discharging grain from barges, lighters, or vessels, railway-trucks, and other vehicles, as well as for storing grain in granaries or docks.

The apparatus consists of a continuous length of flexible or other tubing of any suitable kind, in which a current of air is caused to circulate under pressure produced either by natural or artificial means. Upon this tubing, at one or more points, are branched suction-pipes provided at their lower ends with rose-heads, which are immersed in the grain or other matters to be elevated or transported. The nozzles of the pipes by which the compressed-air is supplied are surrounded at the point of junction of the suction-pipes by a cone similar to that of a Giffard injector, whereby the pulverulent or granular matters will be raised and carried along the pipe by the action of the air-jet to any desired height or distance, regulated by the degree of pressure of the air-jet employed.

Figure 1:
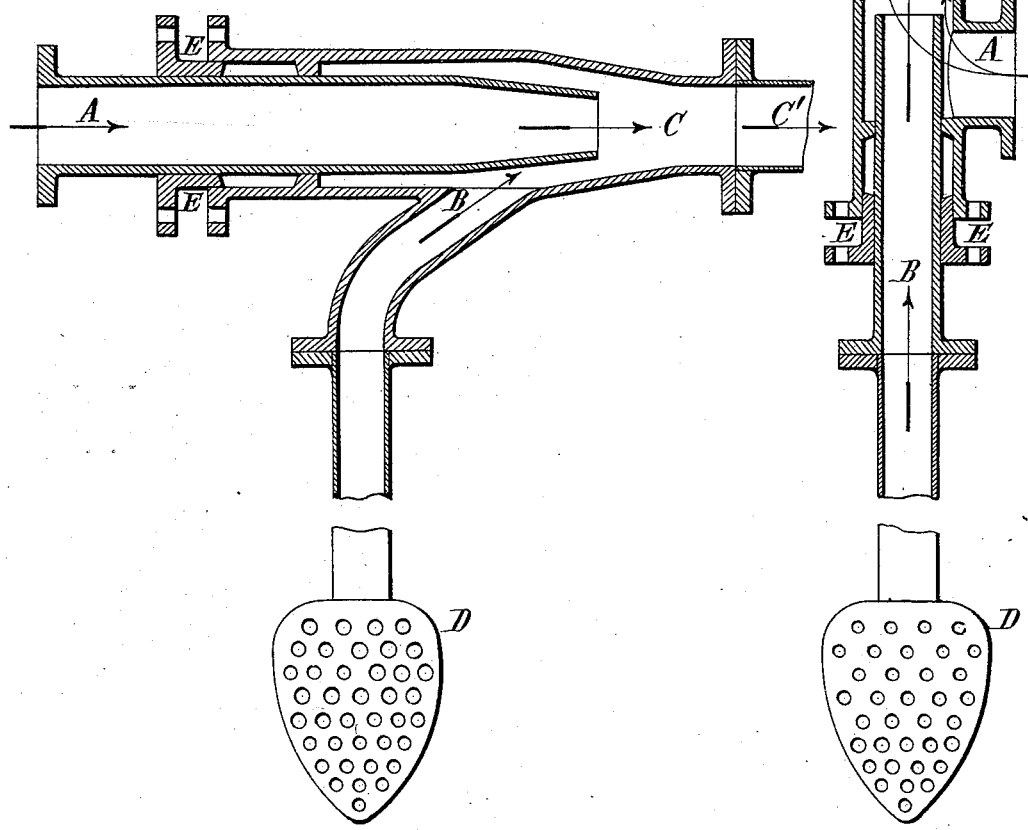
Figure 2:
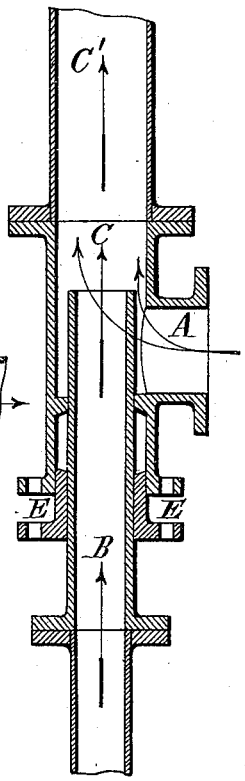

The accompanying drawings show in Figure 1 a sectional elevation of the apparatus, and Fig. 2 a similar view of a different arrangement which may be applied for the purpose; but it will be understood that the arrangement of the various parts may be varied without departing from the invention.

The same letters of reference serve for the same parts in both figures.

A is a nozzle by which compressed air is introduced; B, suction-pipe, terminating at bottom in a rose, D, which is immersed in the matters to be raised or transported.

C is the receiving-cone in which the air-current mixes with the grain or other matter aspirated, and carries it direct into the pipe C'.

The nozzle A is capable of adjustment longitudinally in cone C by sliding it in stuffing-box E by means of any suitable screw or lever arrangement, in order to regulate or stop the air-supply. A light ball-valve, of wood or hollow metal, resting on an india-rubber seat or other equivalent arrangement, may be inserted at any point of the suction-pipe B above the rose D, to serve as a retaining-valve, so that when the exhausting action is arrested by displacing nozzle A the pipes C' may be disconnected in the event of any obstruction.

I claim—

The herein-described apparatus for elevating and transporting granular and pulverulent matters, consisting in the combination of the nozzle A, receiving-cone C, main pipe C', suction-pipe B, and rose D, the pipes A, B, and C' being rigidly united to the cone C, substantially as herein shown and described.

The foregoing specification signed by me this 17th day of April, 1886.

HENRY DELHAYE.

Witnesses:
ROBT. M. HOOPER,
ALBERT MOREAU.